United States Patent
Jamison

(10) Patent No.: US 8,245,213 B2
(45) Date of Patent: *Aug. 14, 2012

(54) METHOD FOR DETERMINING A CLOSE APPROXIMATE BENEFIT OF REDUCING MEMORY FOOTPRINT OF A JAVA APPLICATION

(75) Inventor: Wilfred C. Jamison, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 1015 days.

This patent is subject to a terminal disclaimer.

(21) Appl. No.: 12/137,969

(22) Filed: Jun. 12, 2008

(65) Prior Publication Data

US 2008/0244545 A1    Oct. 2, 2008

Related U.S. Application Data

(63) Continuation of application No. 10/761,991, filed on Jan. 21, 2004, now Pat. No. 7,434,214.

(51) Int. Cl.
*G06F 9/45* (2006.01)
*G06F 12/00* (2006.01)

(52) U.S. Cl. ............................. 717/158; 707/814

(58) Field of Classification Search .......... 717/152–154, 717/127, 131, 158; 707/206, 813, 814; 711/170–171, 151, 154; 718/104

See application file for complete search history.

(56) References Cited

U.S. PATENT DOCUMENTS

| | | | |
|---|---|---|---|
| 5,136,706 A | | 8/1992 | Courts |
| 5,666,114 A | | 9/1997 | Brodie et al. |
| 6,279,012 B1 | * | 8/2001 | Sexton et al. .......................... 1/1 |
| 6,286,016 B1 | | 9/2001 | Heller et al. |
| 6,324,631 B1 | * | 11/2001 | Kuiper ........................... 711/170 |
| 6,804,691 B2 | | 10/2004 | Coha et al. |
| 6,865,657 B1 | | 3/2005 | Traversat et al. |
| 6,874,074 B1 | * | 3/2005 | Burton et al. ................. 711/170 |
| 2002/0072830 A1 | | 6/2002 | Hunt |
| 2003/0182597 A1 | | 9/2003 | Coha et al. |
| 2003/0229766 A1 | * | 12/2003 | Dice et al. ...................... 711/154 |
| 2004/0024798 A1 | * | 2/2004 | Chauvel ....................... 707/206 |

FOREIGN PATENT DOCUMENTS

JP    2001014215    1/2001

OTHER PUBLICATIONS

Oracle, "Tuning Garbage Collection with the 5.0 Java™ Virtual Machine", copyright 2003, Sun Microsystems, pp. 1-16 <gcTuning_JVM5_03.pdf>.*

Chen et al., "Turning Garbage Collection in an Embedded Java Environment", Dec. 6, 2003, pp. 1-12, Microsystems Design Lab. www.cse.psu.edu/~gchen/papers/hpca02.pdf.

(Continued)

*Primary Examiner* — Tuan Anh Vu

(74) *Attorney, Agent, or Firm* — Cuenot, Forsythe & Kim, LLC

(57) ABSTRACT

Changes in performance in a Java program are deduced from information related to garbage collection events of the program. Assumptions are made about the system, the application and garbage collection, and changes in performance that will result from modifying the program are deduced.

21 Claims, 3 Drawing Sheets

OTHER PUBLICATIONS

Chawla, "Fine-tuning Java Garbage Collection Performance", Jan. 1, 2003, pp. 1-10, IBM. http://www-128.ibm.com/developerworks/ibm/library/i-gctroub/.

Nagarajayya et al., "Improving Java Application Performance and Scalability by Reducing Garbage Collection Times and Sizing Memory Using JDK 1.4.1", Nov. 2002, pp. 1-42, Sun Microsystems Inc. http://developers.sun.com/techtopics/mobility/midp/articles/garbagecollection2/.

Kim et al., "Bounding Worst Case Garbage Collection Time for Embedded Real-Time Systems", Oct. 24, 2003, 12 pages. http://search.ieexplore.ieee.org/search97/s97is.vts?action=view&Vd....

Dykstra et al., "An Analysis of the Garbage Collection Performance in Sun's HotSpot Java Virtual Machine", Oct. 24, 2003, 6 pages. http://search.ieexplore.ieee.org/searc...ey=995167&ViewTemplate=printdocview.hts.

Srisa-An et al., "A Performance Analysis of the Active Memory System", Oct. 24, 2003, 6 pages. http://search.ieexplore.ieee.org/search97/s97is.vts?action=view&Vd....

* cited by examiner

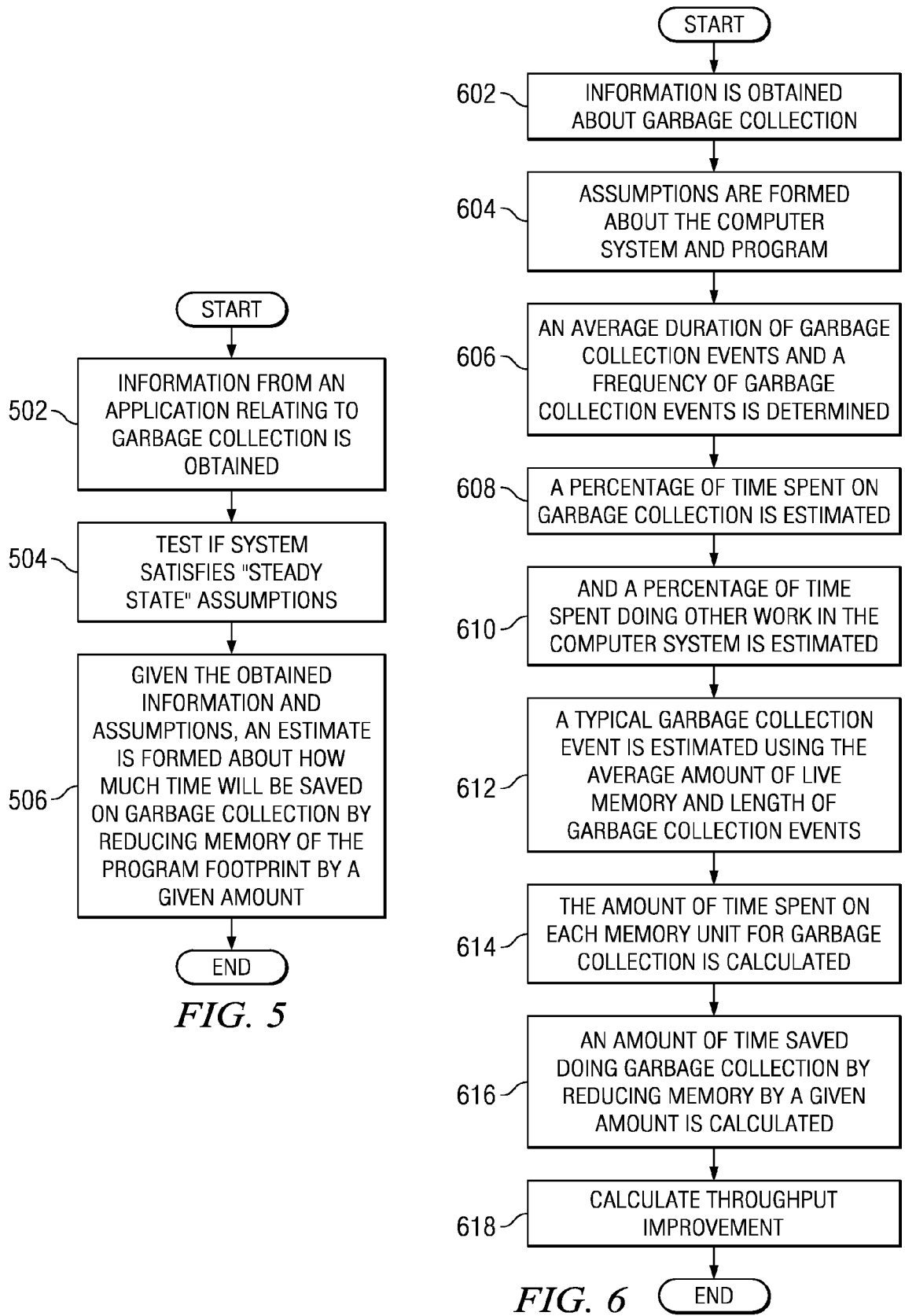

METHOD FOR DETERMINING A CLOSE APPROXIMATE BENEFIT OF REDUCING MEMORY FOOTPRINT OF A JAVA APPLICATION

This application is a continuation of application Ser. No. 10/761,991, filed Jan. 21, 2004, status allowed.

BACKGROUND OF THE INVENTION

1. Technical Field

The present invention relates generally to program performance management, and particularly to estimating the effect on performance of a Java program due to modification of the program.

2. Description of Related Art

In recent years, the use of the Java platform, a product available from Sun Microsystems, Inc., has greatly increased. Particularly, with the rise of the Internet, the Java programming language became a popular language used by programmers for various types of applications, such as Web applications, enterprise applications, etc. The reason behind this popularity is the characteristics that Java programming language provides, for example, platform-independence and multi-threading support.

Platform-independence is enabled in Java through the use of a Java Virtual Machine (JVM). The JVM first translates a program written in the Java programming language into standard bytecodes, as defined in the JVM specifications. When the program runs, the JVM interprets the bytecodes and executes each bytecode. Another technology that was introduced in Java is "Just-in-Time" (JIT) compilation. In this case, the bytecodes are compiled into native code before they are executed. The native code is comprised of machine instruction that are specific to the platform in which the JVM is running. Thus, any computer platform may run Java applications as long as it contains a Java runtime environment, which interprets the bytecode and optionally compiles them into native code at runtime (hence the name) for a specific operating system.

The JVM specification uses garbage collection for memory management. The Java programming language enables programmers to create objects without having to destroy them explicitly when they are no longer needed. The language ensures that memory allotted to unused objects will be reclaimed eventually and put back to the heap. An object is unused if there are no other objects that reference it. The heap is a portion of the JVM runtime environment from where memory needed to create an object is taken. Thus, the JVM maintains the free memory in the heap so it knows where to get them when needed. The JVM has a default size for a heap although users can specify the minimum and maximum size when invoking the JVM runtime. The heap starts at a minimum size and it continues to grow when more and more memory is needed by the program. However, it cannot exceed the maximum. The heap can also shrink in size when it is determined that it is too big and there are not a lot of objects being created, and when it has been specified that heap shrinking is allowed to happen.

Garbage collection (GC) is an event that takes place when an object needs to be created but there is not enough free memory to create that object. A garbage collector thread executes to detect all unused objects and return them to the heap as free memory. The goal is to be able to collect enough free memory for the object that is being created. Garbage collection events suspend all running threads (except the garbage collection thread). Garbage collection events can be a performance bottleneck when they happen very frequently since during this time, no other threads can run and therefore no actual work can be done, thus, reducing throughput and increasing response time.

There are two major concerns with garbage collection: (1) the duration of a GC event—the longer a GC event takes place, the longer the other threads are suspended. Thus, a very long GC event can be noticeable through poor response time. The duration of a GC event depends on the footprint and the size of the heap. The footprint is the amount of used memory (or active objects); (2) the frequency of GC events—the more often a GC event takes place, the more time threads are being suspended and therefore throughput is reduced. The frequency of GC events depends also on the footprint, size of the heap and the allocation rate, that is, how fast is the program creating objects.

Programmers often attempt to reduce this burden on the system by minimizing GC events which can be achieved by creating objects conservatively. Having said this, the use of objects is a key factor for optimizing performance of Java programs. The use of objects affects the footprint required for an application. The smaller the footprint, the better the performance. Thus, the questions often asked are: Can we reduce the footprint of a Java application? How can we reduce it? Do we know how much improvement we will get if we reduce the footprint? The answer to the first question is easy to determine as programmers can investigate in their programs if they can still optimize the use of objects. For the second question, there are known ways to reduce footprint—object pools, object reuse, etc. For the last question, the actual benefit manifests itself in terms of improvement in throughput, more so than response time. however, quantifying the actual benefit can be done only by actually rewriting the program to reduce footprint, running the program, and comparing the throughput with previous runs. Thus, programmers use a 'trial and error' approach in optimizing garbage collection. A utility called verbosegc in Java allows programmers to gather garbage collection statistics such as the number of garbage collection events, duration of the garbage collection, etc. However, there is no systematic way to determine change in performance immediately without modifying the program and obtaining measurements until a desired result is reached. This trial and error approach can be time consuming, as a program may need to be modified several times and tested each time to see if the performance target has been reached.

Therefore, it would be advantageous to have an improved method and apparatus for determining a close approximate benefit of reducing footprint of a Java application in a systematic manner without using an iterative 'trial and error' approach. This is very useful in situations where there is a target performance throughput and so by knowing the gap between the current throughput and the target throughput, getting an idea of how much reduction in memory footprint is needed to close the gap will facilitate the whole process.

SUMMARY OF THE INVENTION

The present invention determines the effect on a Java program caused by modification of the program. The present invention provides a method, apparatus, and computer instructions for improving performance in a Java program by checking to see if assumptions about the system are satisfied and by collecting information about garbage collection. Using this information and the assumptions formed, a mathematical model for representing the effect of modifications to the program on garbage collection events is made. This model is used to estimate the effect on the program caused by modifications.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 5 shows an overview process flow consistent with implementing a preferred embodiment of the present invention.

FIG. 6 shows a detailed process flow consistent with implementing a preferred embodiment of the present invention.

DETAILED DESCRIPTION OF THE PREFERRED EMBODIMENT

Figure 1:
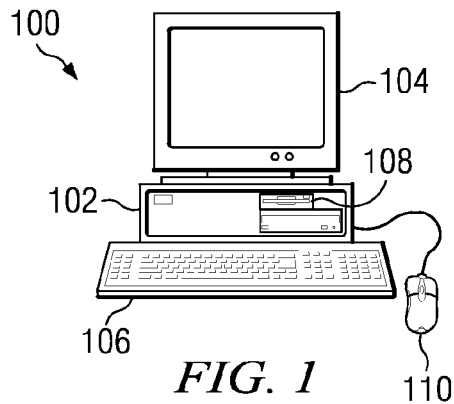
FIG. 1 shows a computer system consistent with implementing a preferred embodiment of the present invention.

With reference now to the figures and in particular with reference to FIG. 1, a pictorial representation of a data processing system in which the present invention may be implemented is depicted in accordance with a preferred embodiment of the present invention. A computer 100 is depicted which includes a system unit 102, a video display terminal 104, a keyboard 106, storage devices 108, which may include floppy drives and other types of permanent and removable storage media, and mouse 110. Additional input devices may be included with personal computer 100, such as, for example, a joystick, touchpad, touch screen, trackball, microphone, and the like. Computer 100 can be implemented using any suitable computer, such as an IBM RS/6000 computer or IntelliStation computer, which are products of International Business Machines Corporation, located in Armonk, N.Y. Although the depicted representation shows a computer, other embodiments of the present invention may be implemented in other types of data processing systems, such as a network computer. Computer 100 also preferably includes a graphical user interface that may be implemented by means of systems software residing in computer readable media in operation within computer 100.

Figure 2:
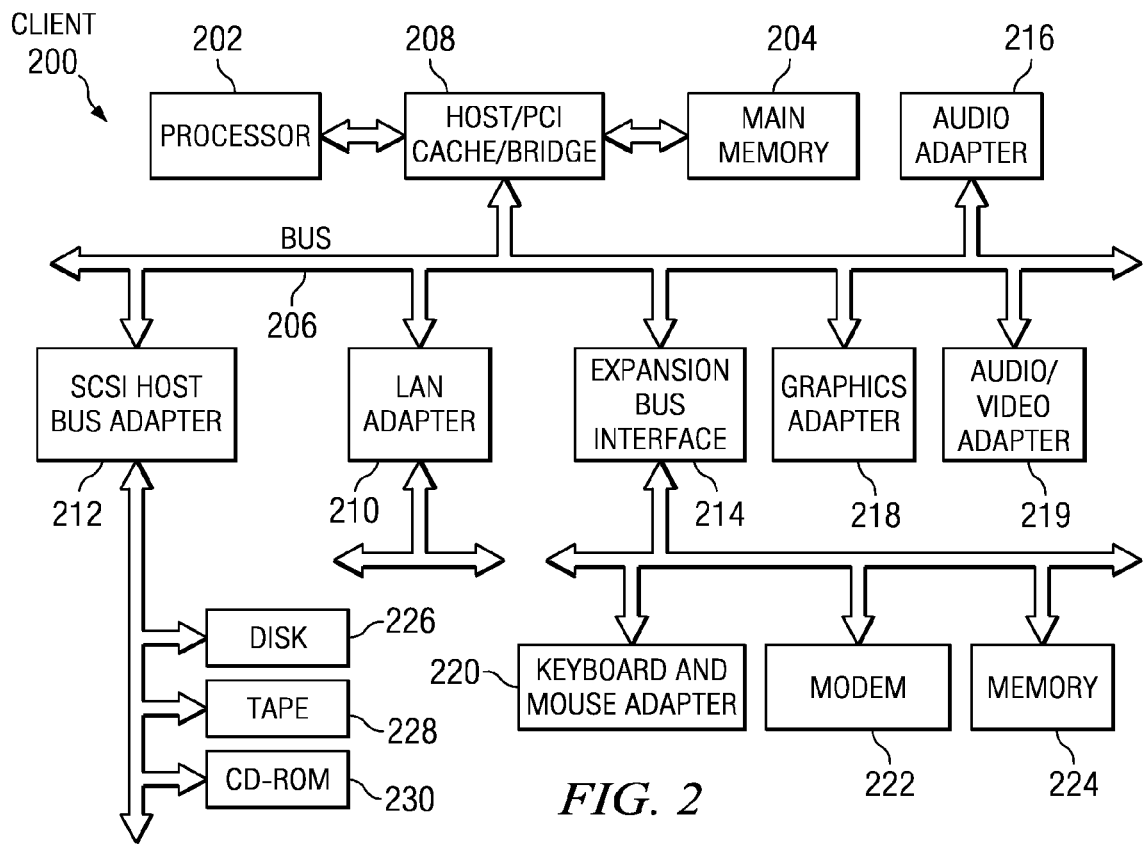
FIG. 2 shows a block diagram of a computer system consistent with implementing a preferred embodiment of the present invention.

With reference now to FIG. 2, a block diagram of a data processing system is shown in which the present invention may be implemented. Data processing system 200 is an example of a computer, such as computer 100 in FIG. 1, in which code or instructions implementing the processes of the present invention may be located. Data processing system 200 employs a peripheral component interconnect (PCI) local bus architecture. Although the depicted example employs a PCI bus, other bus architectures such as Accelerated Graphics Port (AGP) and Industry Standard Architecture (ISA) may be used. Processor 202 and main memory 204 are connected to PCI local bus 206 through PCI bridge 208. PCI bridge 208 also may include an integrated memory controller and cache memory for processor 202. Additional connections to PCI local bus 206 may be made through direct component interconnection or through add-in boards. In the depicted example, local area network (LAN) adapter 210, small computer system interface SCSI host bus adapter 212, and expansion bus interface 214 are connected to PCI local bus 206 by direct component connection. In contrast, audio adapter 216, graphics adapter 218, and audio/video adapter 219 are connected to PCI local bus 206 by add-in boards inserted into expansion slots. Expansion bus interface 214 provides a connection for a keyboard and mouse adapter 220, modem 222, and additional memory 224. SCSI host bus adapter 212 provides a connection for hard disk drive 226, tape drive 228, and CD-ROM drive 230. Typical PCI local bus implementations will support three or four PCI expansion slots or add-in connectors.

An operating system runs on processor 202 and is used to coordinate and provide control of various components within data processing system 200 in FIG. 2. The operating system may be a commercially available operating system such as Windows 2000, which is available from Microsoft Corporation. An object oriented programming system such as Java may run in conjunction with the operating system and provides calls to the operating system from Java programs or applications executing on data processing system 200. "Java" is a trademark of Sun Microsystems, Inc. Instructions for the operating system, the object-oriented programming system, and applications or programs are located on storage devices, such as hard disk drive 226, and may be loaded into main memory 204 for execution by processor 202.

Those of ordinary skill in the art will appreciate that the hardware in FIG. 2 may vary depending on the implementation. Other internal hardware or peripheral devices, such as flash ROM (or equivalent nonvolatile memory) or optical disk drives and the like, may be used in addition to or in place of the hardware depicted in FIG. 2. Also, the processes of the present invention may be applied to a multiprocessor data processing system.

For example, data processing system 200, if optionally configured as a network computer, may not include SCSI host bus adapter 212, hard disk drive 226, tape drive 228, and CD-ROM 230, as noted by dotted line 232 in FIG. 2 denoting optional inclusion. In that case, the computer, to be properly called a client computer, must include some type of network communication interface, such as LAN adapter 210, modem 222, or the like. As another example, data processing system 200 may be a stand-alone system configured to be bootable without relying on some type of network communication interface, whether or not data processing system 200 comprises some type of network communication interface. As a further example, data processing system 200 may be a personal digital assistant (PDA), which is configured with ROM and/or flash ROM to provide non-volatile memory for storing operating system files and/or user-generated data.

The depicted example in FIG. 2 and above-described examples are not meant to imply architectural limitations. For example, data processing system 200 also may be a notebook computer or hand held computer in addition to taking the form of a PDA. Data processing system 200 also may be a kiosk or a Web appliance.

The processes of the present invention are performed by processor 202 using computer implemented instructions, which may be located in a memory such as, for example, main memory 204, memory 224, or in one or more peripheral devices 226-230.

Figure 3:
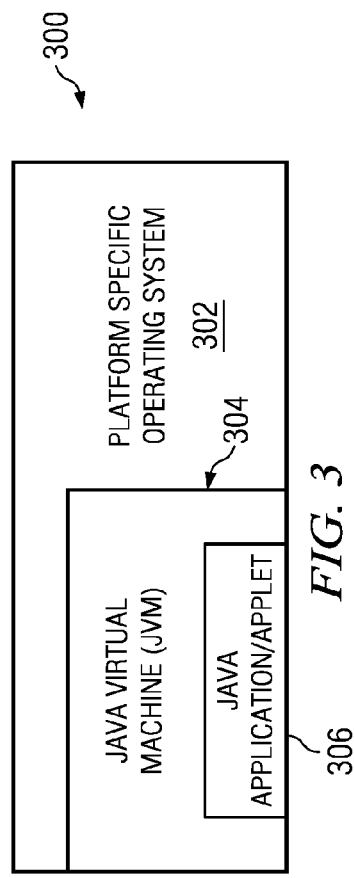
FIG. 3 shows a diagram of a relational components of a Java-based system consistent with implementing a preferred embodiment of the present invention.

With reference now to FIG. 3, a block diagram illustrates the relationship of software components operating within a computer system that may implement the present invention. Java-based system 300 contains platform specific operating system 302 that provides hardware and system support to software executing on a specific hardware platform. JVM 304 is one software application that may execute in conjunction with the operating system. JVM 304 provides a Java run-time environment with the ability to execute Java application or applet 306, which is a program, servlet, or software component written in the Java programming language. The computer system in which JVM 304 operates may be similar to data processing system 200 or computer 100 described above. However, JVM 304 may be implemented in dedicated hardware on a so-called Java chip, Java-on-silicon, or Java processor with an embedded picoJava core.

At the center of a Java run-time environment is the JVM, which supports all aspects of Java's environment, including its architecture, security features, mobility across networks, and platform independence.

The JVM is a virtual computer, i.e. a computer that is specified abstractly. The specification defines certain features that every JVM must implement, with some range of design choices that may depend upon the platform on which the JVM is designed to execute. For example, all JVMs must execute Java bytecodes and may use a range of techniques to execute the instructions represented by the bytecodes. A JVM may be implemented completely in software or somewhat in hardware. This flexibility allows different JVMs to be designed for mainframe computers and PDAs.

The JVM is the name of a virtual computer component that actually executes Java programs. Java programs are not run directly by the central processor but instead by the JVM, which is itself a piece of software running on the processor. The JVM allows Java programs to be executed on a different platform as opposed to only the one platform for which the code was compiled. Java programs are compiled for the JVM. In this manner, Java is able to support applications for many types of data processing systems, which may contain a variety of central processing units and operating systems architectures. To enable a Java application to execute on different types of data processing systems, a compiler typically generates an architecture-neutral file format—the compiled code is executable on many processors, given the presence of the Java run-time system. The Java compiler generates bytecode instructions that are nonspecific to a particular computer architecture. A bytecode is a machine independent code generated by the Java compiler and executed by a Java interpreter. A Java interpreter is part of the JVM that alternately decodes and interprets a bytecode or bytecodes. These bytecode instructions are designed to be easy to interpret on any computer and easily translated on the fly into native machine code. Byte code may be translated into native code by a just-in-time compiler or JIT.

A JVM loads class files and executes the bytecodes within them. The class files are loaded by a class loader in the JVM. The class loader loads class files from an application and the class files from the Java application programming interfaces (APIs) which are needed by the application. The execution engine that executes the bytecodes may vary across platforms and implementations.

One type of software-based execution engine is a just-in-time compiler. With this type of execution, the bytecodes of a method are compiled to native machine code upon successful fulfillment of some type of criteria for jitting a method. The native machine code for the method is then cached and reused upon the next invocation of the method. The execution engine may also be implemented in hardware and embedded on a chip so that the Java bytecodes are executed natively. JVMs usually interpret bytecodes, but JVMs may also use other techniques, such as just-in-time compiling, to execute bytecodes.

When an application is executed on a JVM that is implemented in software on a platform-specific operating system, a Java application may interact with the host operating system by invoking native methods. A Java method is written in the Java language, compiled to bytecodes, and stored in class files. A native method is written in some other language and compiled to the native machine code of a particular processor. Native methods are stored in a dynamically linked library whose exact form is platform specific.

Figure 4:
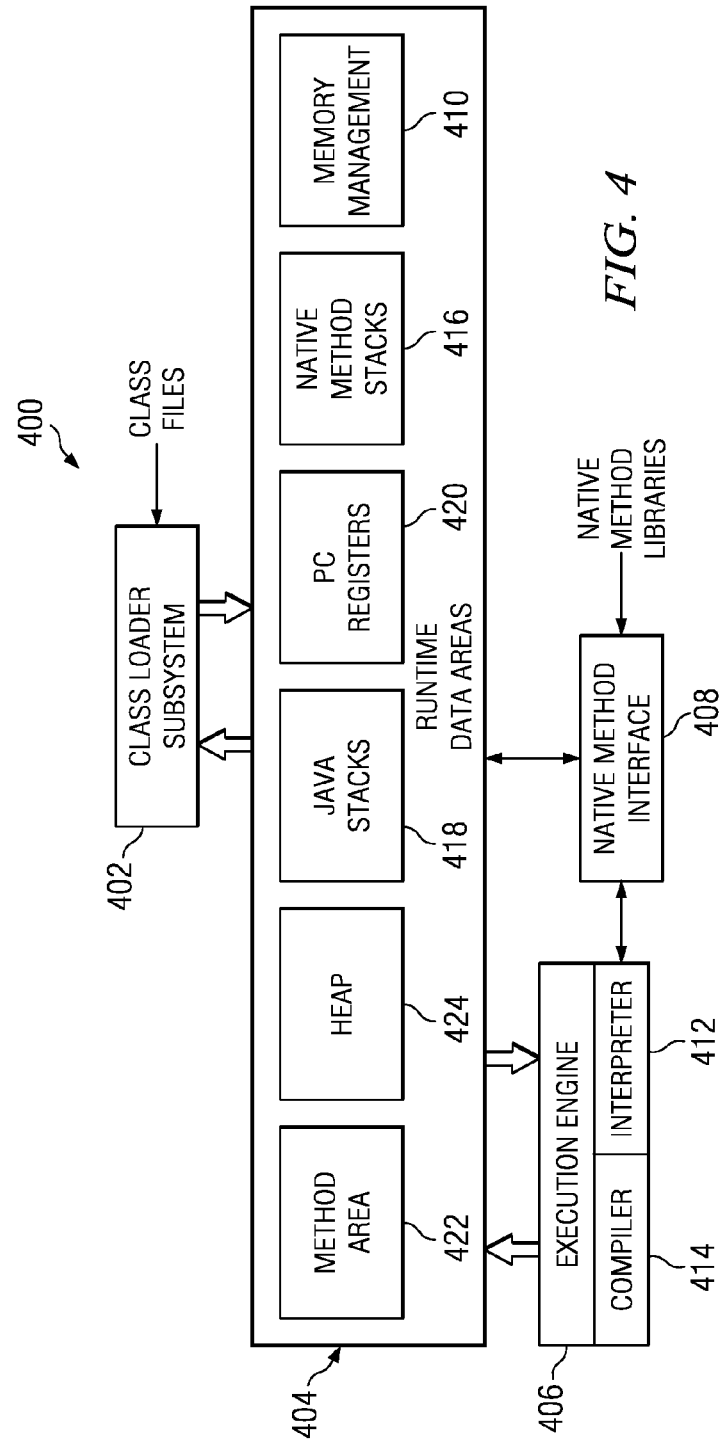
FIG. 4 shows a Java Virtual Machine (JVM) consistent with implementing a preferred embodiment of the present invention.

With reference now to FIG. 4, a block diagram of a JVM is depicted in accordance with a preferred embodiment of the present invention. JVM 400 includes a class loader subsystem 402, which is a mechanism for loading types, such as classes and interfaces, given fully qualified names. JVM 400 also contains runtime data areas 404, execution engine 406, native method interface 408, and memory management 410. Execution engine 406 is a mechanism for executing instructions contained in the methods of classes loaded by class loader subsystem 402. Execution engine 406 may be, for example, Java interpreter 412 or just-in-time compiler 414. Native method interface 408 allows access to resources in the underlying operating system. Native method interface 408 may be, for example, a Java native interface.

Runtime data areas 404 contain native method stacks 416, Java stacks 418, PC registers 420, method area 422, and heap 424. These different data areas represent the organization of memory needed by JVM 400 to execute a program.

Java stacks 418 are used to store the state of Java method invocations. When a new thread is launched, the JVM creates a new Java stack for the thread. The JVM performs only two operations directly on Java stacks: it pushes and pops frames. A thread's Java stack stores the state of Java method invocations for the thread. The state of a Java method invocation includes its local variables, the parameters with which it was invoked, its return value, if any, and intermediate calculations. Java stacks are composed of stack frames. A stack frame contains the state of a single Java method invocation. When a thread invokes a method, the JVM pushes a new frame onto the Java stack of the thread. When the method completes, the JVM pops the frame for that method and discards it. The JVM does not have any registers for holding intermediate values; any Java instruction that requires or produces an intermediate value uses the stack for holding the intermediate values. In this manner, the Java instruction set is well-defined for a variety of platform architectures.

PC registers 420 are used to indicate the next instruction to be executed. Each instantiated thread gets its own pc register (program counter) and Java stack. If the thread is executing a JVM method, the value of the pc register indicates the next instruction to execute. If the thread is executing a native method, then the contents of the pc register are undefined. Native method stacks 414 store the state of invocations of native methods. The state of native method invocations is stored in an implementation-dependent way in native method stacks, registers, or other implementation-dependent memory areas. In some JVM implementations, native method stacks 414 and Java stacks 416 are combined.

Method area 422 contains class data while heap 424 contains all instantiated objects. The JVM specification strictly defines data types and operations. Most JVMs choose to have one method area and one heap, each of which are shared by all threads running inside the JVM. When the JVM loads a class file, it parses information about a type from the binary data contained in the class file. It places this type information into the method area. Each time a class instance or array is created, the memory for the new object is allocated from heap 424. JVM 400 includes an instruction that allocates memory space within the memory for heap 424 but includes no instruction for freeing that space within the memory. Memory management 410 in the depicted example manages memory space within the memory allocated to heap 424. Memory management 410 may include a garbage collector, which automatically reclaims memory used by objects that are no longer referenced. Additionally, a garbage collector also may move objects to reduce heap fragmentation.

In a preferred embodiment, the present invention provides a system and method for taking information from an application about garbage collection and deducing changes in performance that will result from modifying the program. Information is preferably obtained about garbage collection through verbosegc, which provides information about garbage collection events in a text file.

The present invention describes a mathematical system for determining the likely effects on program performance resulting from program modification. The mathematical aspects of the present invention can be done manually or programmed into a computer system for automatic execution.

Performance benefit in a program may be gained by reducing actual garbage collection and object creation. These two tasks have associated costs, and by reducing their frequency and/or duration of execution, the associated cost to the system (in delayed or suspended threads, for example) is also reduced. The direct cost of garbage collection is the pausing time which affects response time as well as throughput. In a preferred embodiment, the present invention uses two variables when calculating the cost of garbage collection: the duration of the garbage collection, and the frequency of the garbage collection.

By minimizing either or both of these variables, the cost of garbage collection is minimized. The duration of garbage collection (i.e., the pausing time imposed on other threads during garbage collection events) depends largely on several variables. For example, the amount of garbage that must be cleaned up, the algorithm used to do the collecting or copying, the heap compaction, reconciling object references that are moved, and the number and nature of finalizers that must be executed.

The frequency of garbage collection is influenced by the rate of object creation, the heap fragmentation, the size of the heap, and the garbage collection policy constraints that may exist in a system. Overall, the duration and frequency of garbage collection events is difficult to predict because they depend heavily on the garbage collection algorithm used, the lifetime of the objects, the allocation rate, and the size of the heap.

The present invention uses a mathematical method to derive a function to predict performance effect caused by program modification. For example, a preferred embodiment of the function estimates how much time will be saved on garbage collection by reducing memory by a given amount.

In this example embodiment, a multivariate function is derived $$y=F(m,t,g,d,f)$$

where m is the amount of memory to be removed from live memory (a.k.a. footprint), t is the current computed throughput (measured in transactions per second), d is the total duration of the program execution from which t was computed, g is the total time spent on garbage collection within the duration d (thus g<d), f is the average footprint during duration d. This expression is used to find y which is the number of transactions gained after reducing the footprint to f−m over the same duration d.

Given the amount of memory to be deducted from the current footprint, it is desired to know how many additional transactions can be computed given the current computed transaction, the total duration of the run, and the portion of that run spent in garbage collection.

In a preferred embodiment, the model imposes certain assumptions. One example set of assumptions follows: After a warm-up run, the system settles into a steady state where the footprint levels off as well as garbage and maximum heap size; the throughput t is computed within a duration d during which the steady state has been observed; a verbosegc output during the steady state has been taken; the exact nature of the garbage collection algorithm is immaterial; the duration d is fixed at a constant value and is not affected by changes in other parameters; and the garbage generation rate is constant.

The following information is obtainable from the verbosegc output, and in a preferred embodiment, variables are assigned as follows:
Total number of GC: c
Total time spent in GC: g
Current heap size: HeapSize
Total duration of the run: d
Average GC time: GCavg
Average GC interval: GCINTavg
Average garbage collected per GC: GARBAGEavg
Average live memory per GC: LIVEMEMavg.

A steady state is defined as occurring when:
the standard deviation from GCINTavg<5%
the standard deviation from GCavg<5%
the standard deviation from GARBAGEavg<5%
the standard deviation from LIVEMEMavg<5%
the HeapSize is the same all throughout.

Given these variables and assumptions, an example embodiment of the method for estimating performance based on the modification is discussed. The basic idea is to transfer time spent on garbage collection into time actually spent used to do actual work. Consequently, pausing time will be reduced and additional throughput can be computed given that the duration of the run remains constant. From the given information, it is possible to compute the percentage of time that was spent for garbage collection and for doing actual work. It is known that the most expensive works in garbage collection are marking and compaction, both of which are proportional to the amount of live memory. Then we can very roughly assume that all of the garbage collection time is spent on the live memory. With the system in a steady state, the average amount of live memory and the average length of garbage collection may be used to represent a typical garbage collection event. Therefore the amount of time spent on each memory unit (in bytes) can be computed by dividing GCavg by LIVEMEMavg.

Let q=GCavg/LIVEMEMavg. The result has units of sec/bytes. Thus, reducing the amount of memory by m results in m*q (bytes*sec/bytes) seconds saved in doing garbage collection (where "*" represents multiplication). This time can be spent doing work. The GC count or c also decreases as there will be less occurrences of GC events by virtue of the assumptions that (a) object allocation rate is the same, and (b) total heap is the same. We can estimate what c' (c after reducing the footprint by m) will be under this situation. The GC count is inversely proportional to HeapSize−(f−m), that is, the bigger the available space for garbage, the less garbage collection will occur. Thus, $$c'=[(\text{HeapSize}-f)/(\text{HeapSize}-(f-m))]*c$$

Here it is known that c' is always less than c because [(HeapSize−f)/(HeapSize−(f−m))] is always less than one. Note that f>m since you cannot reduce more than what the current footprint is. Now, the new total garbage collection time g' can be computed, which is determined by g'=g−c'*(m*q). Recall that M*q is the amount of time saved from doing a garbage collection. Thus, c'*(m*q) is the total amount of time saved not doing GC. Meanwhile, d−g is the total amount of time spent doing actual work. Consequently, d−g' is the total amount of time spent doing actual work after reducing the footprint f by m. Using ratios and proportions, $t/(d-g)$ as to $t'/(d-g')$ yields $t'=(d-g')/(d-g)*t$ which yields a result in which t'>t because (d-g')/(d-g) is always greater than or equal to one. Thus, $y=t'-t$ and the computed improvement factor is determined to be $(d-g')/(d-g)-1$ These calculations are only one example of how the present invention can be implemented. Other assumptions can be made, and other variables can be used or omitted from the above described model without deviating from the spirit of the present invention. The primary concern of the present invention is the ability to predict or estimate the improvement in terms of throughput in a Java program based on the amount of memory footprint used by the program. If this can be done then we can easily provide a tool that simulates improvements instead of measuring them empirically. Once the right amount of memory reduction has been determined to achieve the desired throughput, modification of the program can be made to achieve the memory footprint reduction.

FIG. 5 shows a process flow for implementing a preferred embodiment of the present invention. Though the described calculations can be performed manually, they can also be automated and programmed to be performed by a computer system, such as system 100 of FIG. 1. In this generalization of the innovative process, information from an application relating to garbage collection is obtained (step 502). Next, the system is tested to see if it satisfies the "steady state" assumptions, as described above (step 504), such as, for example, the nature of a steady state of the system, the throughput of the system, the nature of the garbage collection algorithm of the system, the duration of garbage collection events, and the garbage generation rate. Note that these are only examples and are not intended to limit the scope of the present invention. Finally, given the obtained information and assumptions, an estimate is formed about how much time will be saved on garbage collection by reducing memory of the program footprint by a given amount (step 506), with the process terminating thereafter.

FIG. 6 shows a more detailed example of implementing a preferred embodiment of the present invention. Again, such an analysis as is presented can be performed manually or by a computer program designed to execute the innovative method, such as computer system 100 of FIG. 1. First, information is obtained about garbage collection (step 602). Next, assumptions are formed about the computer system and program (step 604). An average duration of garbage collection events and a frequency of garbage collection events is determined (step 606). Next, a percentage of time spent on garbage collection is estimated (step 608) and a percentage of time spent doing other work in the computer system is estimated (step 610). Next, a typical garbage collection event is estimated using the average amount of live memory and length of garbage collection events (step 612). The amount of time spent on each memory unit for garbage collection is calculated (step 614). Finally, an amount of time saved doing garbage collection by reducing memory by a given amount is calculated (step 616). Finally, the quantifiable performance improvements of the system, i.e., the additional throughput garnered from the time savings, is calculated (step 618), with the process terminating thereafter. This can be represented as $t'=(d-g')/(d-g)*t$ where t' is the new throughput while t was the previous throughput before reducing the footprint. Thus, y' (which is the throughput improvement) is simply t'−t.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, within a computer hardware system having a heap, of improving performance in a Java-based computer program, comprising:
   executing the computer program within a virtual machine;
   identifying when the computer program enters a steady state;
   only after the computer program being within the steady state; obtaining information regarding garbage collection associated with the computer program; and
   deducing changes in performance of the computer program that will result from modifying the computer program, wherein
      the steady state is defined as when a standard deviation from an average garbage collection interval is less than 5%.

2. The method of claim 1, further comprising
   estimating a cost of the garbage collection to the performance by
      a duration of an average garbage collection event, and
      a frequency of garbage collection events.

3. The method of claim 2, wherein
   the duration depends upon
      an amount of garbage to be cleaned up,
      an algorithm used to perform the garbage collection;
      a heap compaction,
      a cost of reconciling object references that are moved, and
      a number of finalizers to be executed.

4. The method of claim 2, wherein
   the frequency depends upon
      a rate of object creation,
      a heap fragmentation,
      a size of a heap, and
      a garbage collection policy.

5. The method of claim 1, further comprising
   changing the computer program by reducing an amount of memory from a footprint of the computer program.

6. The method of claim 5, further comprising
determining a number of additional transactions that can be executed during a run based upon
the amount of the memory reduced from the footprint,
a total duration for the run, and
an amount of time the run is spent in garbage collection.

7. The method of claim 1, wherein
the information associated with the garbage collection is obtained from a verbosegc.

8. A computer hardware system configured to improve a performance in a Java-based computer program, comprising:
a memory including a heap; and
a processor, wherein the processor is configured to perform:
executing the computer program within a virtual machine;
identifying when the computer program enters a steady state;
only after the computer program being within the steady state; obtaining information regarding garbage collection associated with the computer program; and
deducing changes in performance of the computer program that will result from modifying the computer program, wherein
the steady state is defined as when a standard deviation from an average garbage collection time is less than 5%.

9. The computer hardware system of claim 8, wherein
a cost of the garbage collection to the performance is estimated using
a duration of an average garbage collection event, and
a frequency of garbage collection events.

10. The computer hardware system of claim 9, wherein
the duration depends upon
an amount of garbage to be cleaned up,
an algorithm used to perform the garbage collection;
a heap compaction,
a cost of reconciling object references that are moved, and
a number of finalizers to be executed.

11. The computer hardware system of claim 9, wherein
the frequency depends upon
a rate of object creation,
a heap fragmentation,
a size of a heap, and
a garbage collection policy.

12. The computer hardware system of claim 8, wherein
the processor is further configured to perform:
changing the computer program by reducing an amount of memory from a footprint of the computer program.

13. The computer hardware system of claim 12, wherein
the processor is further configured to perform:
determining a number of additional transactions that can be executed during a run based upon
the amount of the memory reduced from the footprint,
a total duration for the run, and
an amount of time the run is spent in garbage collection.

14. A computer program product comprising a computer usable storage medium having stored therein computer usable program code for improving performance in a Java-based computer program, the computer usable program code, which when executed by a computer hardware system, causes the computer hardware system to perform:
executing the computer program within a virtual machine;
identifying when the computer program enters a steady state;
only after the computer program being within the steady state; obtaining information regarding garbage collection associated with the computer program; and
deducing changes in performance of the computer program that will result from modifying the computer program, wherein
the steady state is defined as when a standard deviation from an average garbage collected per garbage collection is less than 5%.

15. The computer program product of claim 14, wherein
the computer usable program code further causes the computer hardware system to perform
estimating a cost of the garbage collection to the performance by
a duration of an average garbage collection event, and
a frequency of garbage collection events.

16. The computer program product of claim 15, wherein
the duration depends upon
an amount of garbage to be cleaned up,
an algorithm used to perform the garbage collection;
a heap compaction,
a cost of reconciling object references that are moved, and
a number of finalizers to be executed.

17. The computer program product of claim 15, wherein
the frequency depends upon
a rate of object creation,
a heap fragmentation,
a size of a heap, and
a garbage collection policy.

18. The computer program product of claim 14, wherein
the computer usable program code further causes the computer hardware system to perform
changing the computer program by reducing an amount of memory from a footprint of the computer program.

19. The computer program product of claim 18, wherein
the computer usable program code further causes the computer hardware system to perform
determining a number of additional transactions that can be executed during a run based upon
the amount of the memory reduced from the footprint,
a total duration for the run, and
an amount of time the run is spent in garbage collection.

20. The computer program product of claim 14, wherein
the information associated with the garbage collection is obtained from a verbosegc.

21. A method, within a computer hardware system having a heap, of improving performance in a Java-based computer program, comprising:
executing the computer program within a virtual machine;
identifying when the computer program enters a steady state;
only after the computer program being within the steady state; obtaining information regarding garbage collection associated with the computer program; and
deducing changes in performance of the computer program that will result from modifying the computer program, wherein
the steady state is defined as when a standard deviation from an average live memory per garbage collection is less than 5%.

* * * * *